United States Patent [19]

Rogers et al.

[11] Patent Number: 5,786,599
[45] Date of Patent: Jul. 28, 1998

[54] ENHANCED SPATIAL RESOLUTION SCINTILLATION DETECTORS

[75] Inventors: W. Leslie Rogers; Neal H. Clinthorne, both of Ann Arbor, Mich.

[73] Assignee: Regents of the University of Michigan, Ann Arbor, Mich.

[21] Appl. No.: 739,357

[22] Filed: Oct. 30, 1996

[51] Int. Cl.$^6$ ............................................. G01J 1/58
[52] U.S. Cl. ............................ 250/483.1; 250/368
[58] Field of Search ........................ 250/368, 483.1

[56] References Cited

U.S. PATENT DOCUMENTS 3,994,835  11/1976  Vosburgh ..................... 250/487

FOREIGN PATENT DOCUMENTS

2544356A1  4/1976  Germany ..................... 250/368

*Primary Examiner*—Don Wong
*Attorney, Agent, or Firm*—Rothwell, Figg, Ernst & Kurz

[57] ABSTRACT

Spatial resolution in imaging-type scintillation detectors, such as gamma ray cameras used in nuclear medicine, is improved by providing an array of multi-faceted corner-cube reflectors on the back surface of the scintillator crystal. The reflectors modify the light spread function of the scintillator in accordance with any number of different applications, by appropriate adjustment of the orientation angle between facets.

14 Claims, 6 Drawing Sheets

ENHANCED SPATIAL RESOLUTION SCINTILLATION DETECTORS

This invention was supported in part by U.S. Government funding under grant RO CA32846 awarded by the National Institutes of Health. The U.S. Government has certain rights in this invention.

BACKGROUND OF THE INVENTION

1. Field of the Invention

This invention generally relates to radiation sensitive imaging devices used in nuclear medicine, and more specifically relates to improvements in the spatial resolution of scintillation-type detectors.

2. Background and Prior Art

Nuclear imaging involves the detection of photons, such as gamma rays, emitted from a source, such as an internal organ of a patient which contains a dose of a radiopharmaceutical compound. The detector typically takes the form of a large area scintillation crystal, conventionally made of NaI, which absorbs incident gamma ray photons from the object under study and interacts with the absorbed gamma rays to produce light events in the crystal. An array of photomultiplier tubes is placed adjacent to the crystal to detect and amplify these light events, so as to calculate the spatial location of the incident gamma ray and its energy level. Detection of a large number of incident gamma rays of appropriate energies then results in a two-dimensional image of the object under study, which may be displayed on a CRT or printed as a hard copy image.

The thickness of the scintillation crystal is governed by the energy level and type of incident radiation to be imaged. The higher the energy, the greater the thickness required to stop or absorb the incident photon within the crystal so as to cause a scintillation interaction. In nuclear medicine, gamma rays with energies between 70 keV and 511 keV are used for imaging. A crystal thickness of about 5 mm is sufficient to absorb almost 100% of the incident 70 keV gamma rays, while a thickness of greater than 50 mm is needed to absorb gamma rays at 511 keV.

The imaging of the radiation field requires calculation of the spatial coordinates of the detected photons in an X-Y plane corresponding to the large area of the crystal, orthogonal to the direction of the incident photons, with the thickness of the crystal being in the Z plane.

Interaction of incident gamma rays with the crystal causes a short flash of light ("light event") to emanate from the crystal at the point of interaction, and is detected by the photomultiplier tubes which output a voltage proportional to the amplitude of the detected light. The voltage signals from all photomultiplier tubes in the array are then weighted and added together to estimate the precise X,Y coordinate at which the light event occurred in the crystal. The wavelength of the light event is dependent upon the crystal material, and the amplitude of the light event is dependent upon the energy of the absorbed gamma ray.

Because the light emanates from the point of interaction in all directions, the ability to accurately estimate the X,Y coordinates of the corresponding light event from the distribution of the light photons over the entire array of photomultiplier tubes critically depends on the actual spatial distribution of the light, and the intrinsic spatial resolution, sensitivity and noise properties of the optical detectors.

The total amount of emitted light from a scintillation interaction is a function of the light conversion efficiency of the particular scintillation crystal and the amount of energy deposited in the crystal by the incident gamma ray photon. Given the total amount of light emitted as a result of interaction and its spatial distribution, it is possible to place lower statistical bounds on the accuracy with which the X,Y coordinates of the light event may be calculated. In practice, the lower bounds are then modified by the spatial resolution and noise properties of the optical detectors to provide estimates of the best resolution obtainable for the system as a whole. Generally, the smaller the spatial distribution of light is, and the greater the amount of light which is incident on the optical detectors, the more accurate the calculation of the spatial coordinates of the light event in the crystal.

The spatial distribution of light at the detecting surface is a function of the distance of the light source from the surface and also depends upon the optical characteristics of the scintillator crystal and its surfaces. The intensity distribution at the optical detector depends upon the degree of optical coupling between the surface of the crystal and the optical detector and upon the surface finish of the crystal.

The light intensity decreases inversely as the square of the distance between the light point source and the optical detector surface times the cosine of the angle between the direction of propagation and the normal to the detector surface. For scintillation crystals with large X,Y dimensions as compared to the Z (thickness) dimension, approximately one half of the emitted light is directed toward the optical detectors, and the other half is directed toward the opposite surface of the crystal. Consequently, it would be advantageous to minimize light loss from the crystal, maximize the amount of light directed toward the optical detectors, and to concentrate the distribution of this light onto the optical detectors at the spatial coordinates of the scintillation event.

Present methods used to control the spread of light in scintillation crystals includes sanding the surface with grit material, segmenting the scintillation crystal into individual strips or cubes, making cuts to controlled depths in the scintillator, and growing long crystals in a preferred orientation which tends to propagate light along the crystal direction. None of these methods has proven satisfactory, and thus there remains a need in the art to feasibly reduce the light distribution in a scintillator to achieve increased spatial resolution.

SUMMARY OF THE INVENTION

The present invention provides an improvement to nuclear imaging scintillation crystal by providing an array of discrete reflector elements on the surface of the crystal opposite that interfacing with the optical detectors. These reflectors cause light rays propagating away from the optical detectors to be reflected in a controlled manner back to the optical detectors parallel to the incident light rays. The effect of the reflector elements is to concentrate the light at the point of projection of the X,Y coordinates of the light event onto the photodetectors, thereby providing a narrower distribution of light for more accurate position calculation and energy level determination.

In particular, according to one aspect, the present invention provides a scintillator, which interacts with invisible radiation particles to produce visible scintillation events, comprising a first planar surface for coupling to a scintillation detector for detecting the scintillation events, and a second surface opposite the planar surface having an array of discrete reflector elements formed thereon for reflecting light rays from the visible scintillation events back toward the planar surface so as to reduce the light spread function of the scintillator.

According to a second aspect, the present invention provides a method for increasing spatial resolution of a scintillator which interacts with invisible radiation to produce radiation at visible wavelengths, comprising the steps of providing a scintillator for interaction with invisible radiation, and forming an array of discrete reflector elements in a first surface of the scintillator opposite to a second surface which is to be coupled to a photodetector array for detecting said visible radiation, for reflecting visible radiation incident thereon back toward the photodetector array in a controlled fashion.

BRIEF DESCRIPTION OF THE DRAWINGS

The present invention will become more fully understood from the detailed description given hereinbelow and the accompanying drawings, wherein.

DETAILED DESCRIPTION OF THE PREFERRED EMBODIMENTS

Figure 2A:
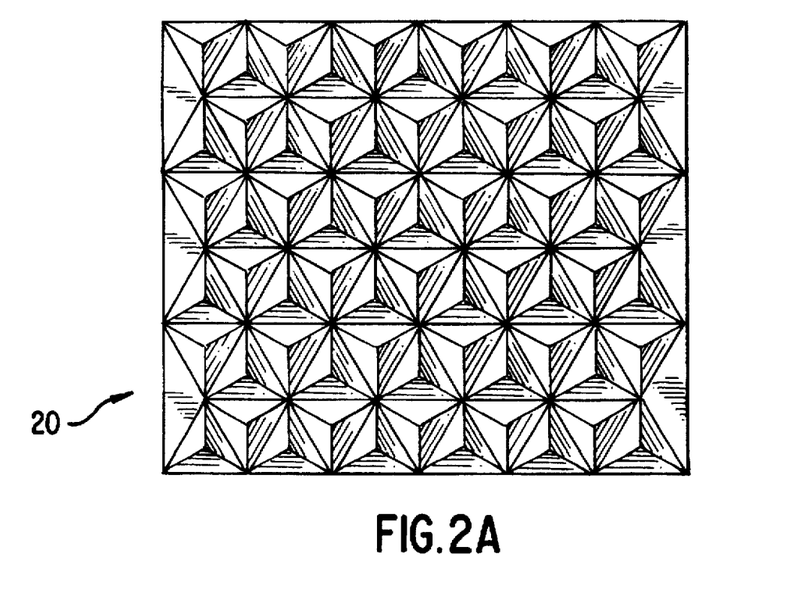
FIGS. 2A and 2B are a top and perspective view, respectively, of an array of reflector elements according to the present invention which are cut into the surface of a scintillator crystal.
Figure 2B:
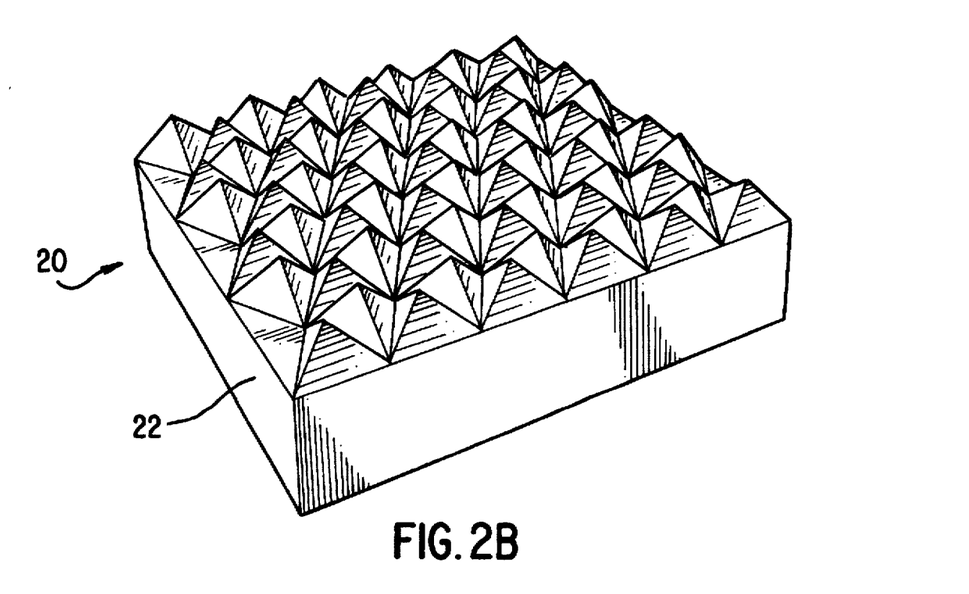

The present invention achieves a significant improvement in the spatial resolution of scintillation detectors, by providing an array of discrete reflector elements, called corner-cube reflectors, on the surface of the scintillation crystal opposite that of the optical sensors. FIGS. 2A and 2B illustrate an array 20 of corner-cube reflectors cut into the surface of a scintillation crystal 22, according to one embodiment of the present invention.

Figure 7:
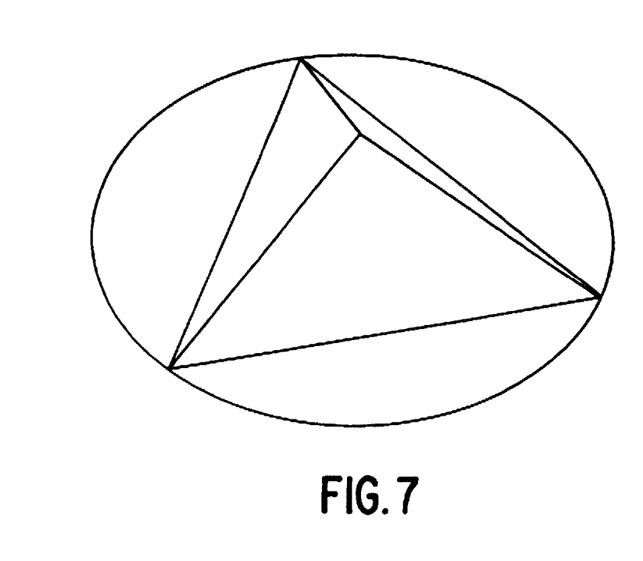
FIG. 7 is a perspective view of a single reflector element according to one preferred embodiment of the present invention.

The reflectors are called corner-cubes because their shape generally corresponds to a shape formed by slicing a cube along a plane passing through the diagonal center of one side of a cube and bisecting the lower corner formed by two adjacent sides of the cube, as shown in FIG. 7.

Figure 1A:
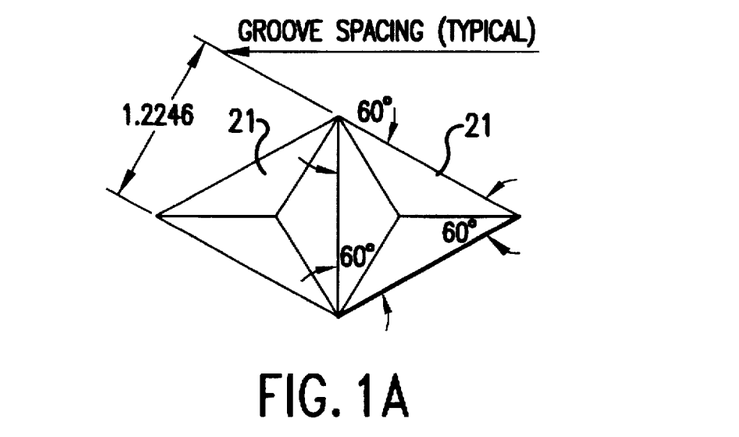
FIGS. 1A and 1B are a top and side view, respectively, of two reflector elements according to one embodiment of the preferred invention.
Figure 1B:
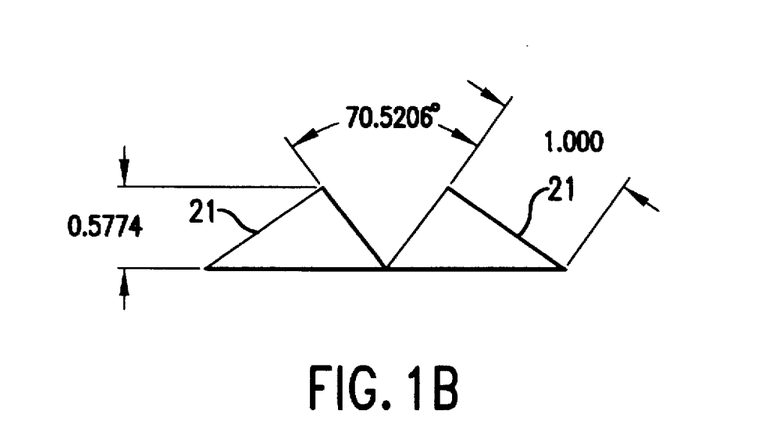
Figure 8:
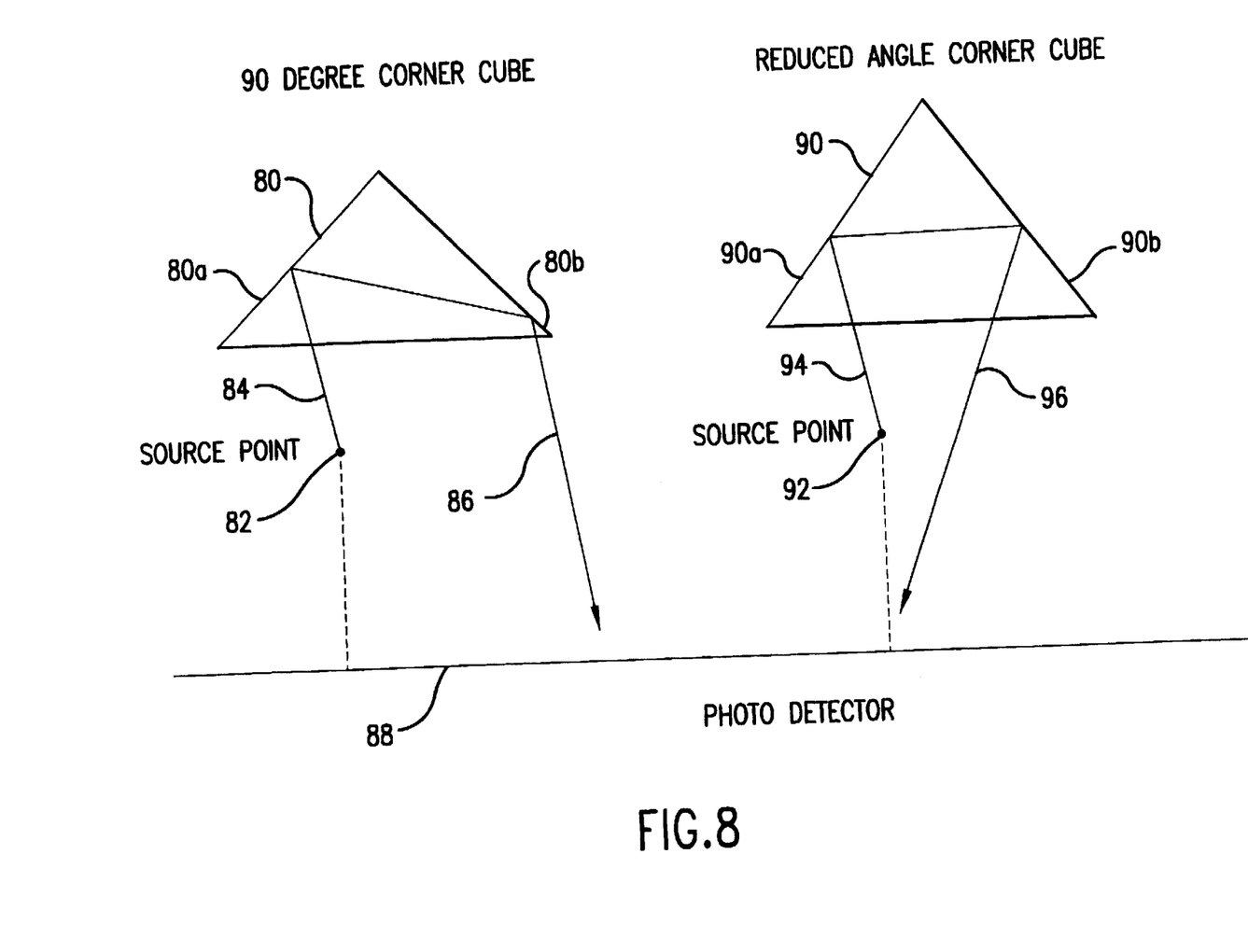
FIG. 8 is a diagram showing various modes of reflection for different reflector elements constructed in accordance with the present invention.

FIGS. 1A and 1B illustrate a pair of corner-cube reflector elements 21. In this embodiment, the adjacent faces of each element 21 are at 90° to each other. As shown in FIGS. 2A and 2B, the reflector elements are formed as an integral part of the scintillator crystal, and have a reflective property such that light reflected from the facets of each element is directed back to the photodetector surface of the crystal parallel to the incident ray, but displaced by a distance determined by the size of the reflector element. This is shown in FIG. 8 with reference to 90° corner-cube element 80, wherein an incident ray 84 from point source of light 82 is reflected from surfaces 80a and 80b of element 80, and is sent back toward the photodetector array 88 as reflected ray 86, which is parallel to, but displaced from, incident ray 84. The facet surfaces of the reflector elements are preferably polished.

If the angle between adjacent facets of a reflector element is reduced to less than 90°, as shown in FIG. 8 as reduced angle corner-cube 90, the reflected light will tend to be "focused" on the far side of the point source 92. Here, incident ray 94 is shown reflecting from surfaces 90a and 90b of corner-cube element 90, resulting in a reflecting ray 96 being directed back toward photodetector array 88 at an angle such that the reflecting ray 96 will intersect on the far side of point source 92 with the detector surface at a point projected from the point source perpendicular to the detector surface. This will tend to provide a smaller light spread function for scintillation events occurring close to the reflector elements. By thus "tuning" the angle, optimization of the scintillation crystal performance may be achieved for specific gamma ray energies, the detector may be designed for gamma rays to be incident on one surface of the crystal or the other, or to enhance the ability to measure the depth of interaction (DOI) in the Z direction, by quantifying higher moments of the light distribution.

The corner-cube reflector elements are designed to reflect incident light rays back on a displaced parallel path with the path of the incident rays. The maximum displacement depends on the size of the reflector element, in other words, it is a scaling operation. The object of the reflection is to concentrate the reflected light on the photodetector surface. This is achieved by reducing the angle to less than 90°. The required change in angle is dependent upon the thickness of the crystal and the mean interaction depth of the gamma rays for which spatial resolution is desired to be improved. Monte Carlo simulations have indicated that changing the angle from 90° to about 79° produces a good focusing effect in crystals ranging from ¼ inch to 1 inch thickness, and makes the combined (direct and reflected) spatial distribution fairly insensitive to depth of interaction. This is very suitable for an application in which both low and high energy gamma rays are desired to be imaged with the same imaging camera at high resolution.

On the other hand, if depth of interaction information for high energy gamma rays is desired to be obtained, the difference in distribution between detected light close to the front surface and detected light close to the rear surface of the crystal should be exaggerated. In this case, the angle would be experimentally optimized for this purpose, by determining the light distribution for different reflector parameters and computing the accuracy with which DOI could be determined. In this case, spatial resolution in the X-Y plane would be lost.

The optimal size and angle of the reflector elements also depends on the size of the photodetectors. The photodetectors merely sum up the light impinging on their detecting surfaces, and do not provide any information regarding distribution of light across their surfaces. It is thus of little consequence if the reflector elements introduce a pattern in the reflected light, so long as the scale of the pattern is small as compared with the size of the individual photodetector elements. The pattern of the reflector elements further may introduce variations in the thickness of the scintillation crystal, and this should be minimized to avoid variations in sensitivity. This represents a trade-off with the fact that the smaller the size of the reflector elements, the higher the cost of production and the more wasted material because of tolerance limitations.

Figure 3A:
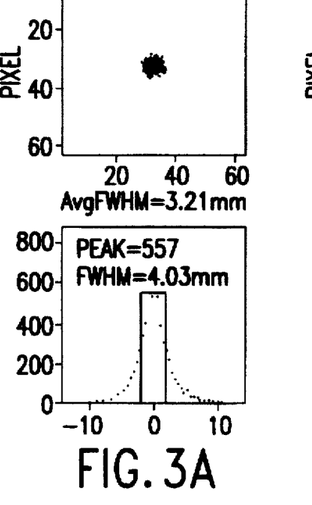
FIGS. 3A–3C are graphs of light intensity distributions for a scintillation crystal having a diffuse reflector on its back surface.
Figure 3B:
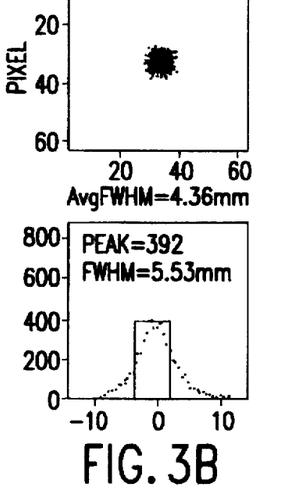
Figure 3C:
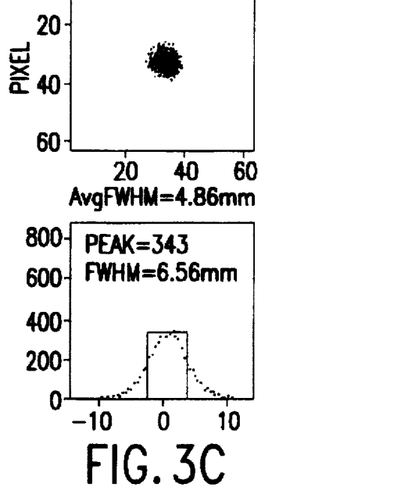
Figure 4A:
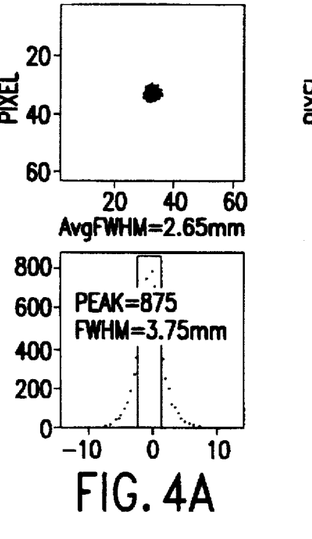
FIGS. 4A–4C are graphs of light intensity distributions for a scintillation crystal as in FIGS. 3A–3C, but with an array of reflector elements according to the present invention on its back surface.
Figure 4B:
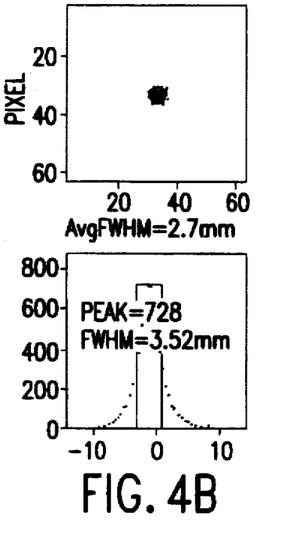
Figure 4C:
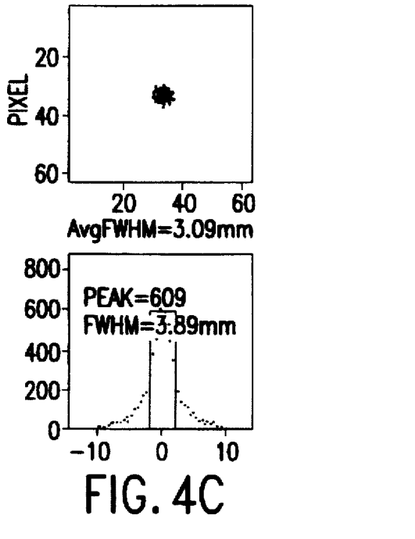
Figure 5A:
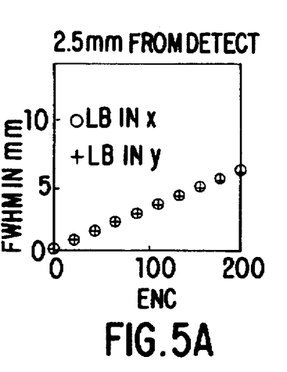
FIGS. 5A–5C are graphs of a lower bound for spatial resolution based on the light intensity distributions of FIGS. 3A–3C.
Figure 5B:
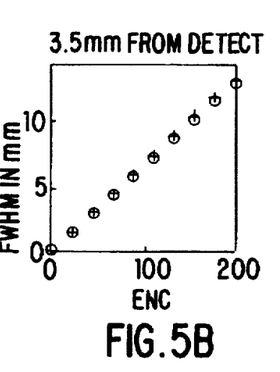
Figure 5C:
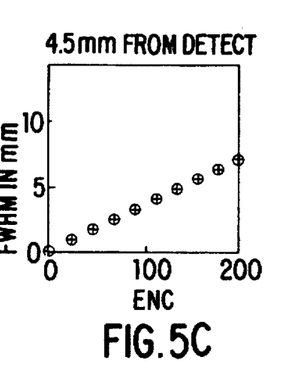
Figure 6A:
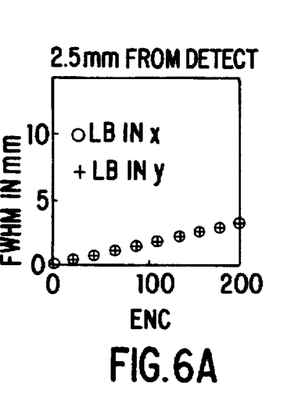
FIGS. 6A–6C are graphs of a lower bound for spatial resolution based on the light intensity distributions of FIGS. 4A–4C.
Figure 6B:
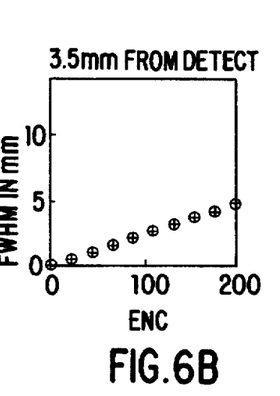
Figure 6C:
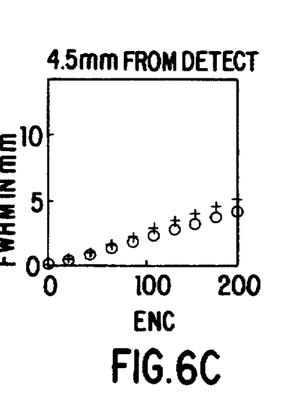

FIGS. 3A–3C illustrate a light intensity distribution on an optical detector surface for a 30 mm×30 mm×5 mm scintillation crystal block having a diffuse reflector with a reflection coefficient of 0.97 on its back surface, with a point source of light respectively at 2.5 mm, 3.5 mm, and 4.5 mm from the detector surface. FIGS. 4A–4C illustrate the light intensity distribution for the same crystal as in FIGS. 3A–3C, but with a 79° polished corner-cube reflectors and a diffuse reflector not optically coupled to the polished surface. As can be seen, the light distribution is significantly decreased with the use of the corner-cube reflector elements.

FIGS. 5A–5C and 6A–6C show lower bounds using the Cramer-Rao calculation for spatial resolution based on light intensity distributions shown in FIGS. 3A–3C and 4A–4C, respectively. The calculations are made for 100 keV γ-rays and 1.8 mm×1.8 mm Si detector pads with 0–200 ENC gaussian noise, assuming a conversion efficiency of 4000 photons/100 keV for the crystal and total quantum efficiency of 70% for the Si detectors. As is seen, the lower bound for spatial resolution is significantly lowered for the scintillation crystal containing the corner-cube reflectors.

Constructing the corner-cube reflectors as an integral part of the scintillation crystal eliminates the need for additional optical interfaces which would cause undesirable reflection of light in directions transverse to the detector surface. Several methods are available for forming the corner-cube reflector elements on the scintillation crystal surface, depending upon the type of crystal and its geometry. For example, CsI is a relatively soft material which is readily machined so that the facets could be milled onto the surface. It is also possible to use a die to impress the reflector element pattern into the surface of the crystal. Alternatively, the crystal could be heated to the softening point in an inert atmosphere and facets of almost any dimension could then be impressed into the surface. The desired optical finish of the facet surfaces could be provided by careful machining with a diamond tool, followed by polishing with a suitable solvent. Plastic scintillators may be machined, cast, or heat-formed to produce the desired reflector element surface. NaI scintillation crystals may be machined or heat-formed. An alternative method for incorporating reflector arrays into a scintillator involves forming the reflector pattern on a thin layer of glass or other material having an index of refraction matched to that of the scintillator. The reflector layer can be optically matched to a flat scintillator surface with high index matching compound.

In addition to the above, it has been found that the scintillator edge and front and back surfaces should be shaped in a manner analogous to the reflector element techniques, such that light reflected from the edge surface has a more unique characteristic to improve spatial resolution at locations approaching the edge. Secondly, improvement in optical transmission and reduction in reflection at the scintillator-detector interface may be achieved by using a compound known as Meltmount, manufactured by Cargill, to attach the scintillator to the detector glass, or by depositing a ¼ wavelength layer of indium-tin-oxide (ITO) on a silicon photodetector. This serves as both an anti-reflective coating and an optical matching layer between the scintillator and a silicon photodetector.

The invention having been thus described, it will become apparent to those skilled in the art that the same may be varied in many ways without departing from the spirit and scope of the invention. Any and all such modifications are intended to be covered by the following claims. For example, while the invention has been described with respect to imaging of gamma rays, it may be possible to use the invention for imaging of other types of radiation particles, such as X-rays. Additionally, the invention may be used in applications other than nuclear medicine, such as astronomy and high-energy physics. The invention has been described with reference to a planar surface. The term planar surface as used herein is meant to encompass flat as well as curved surfaces.

What is claimed is:

1. A scintillator, which interacts with invisible radiation particles to produce visible scintillation events, comprising:
   a first planar surface for coupling to scintillation detector means for detecting said scintillation events; and
   a second surface opposite said planar surface having an array of discrete reflector elements formed thereon for reflecting light rays from said visible scintillation events back toward said planar surface so as to reduce the light spread function of said scintillator, wherein said discrete reflector elements are integrally formed of the same material as said scintillator in said second surface of said scintillator.

2. A scintillator as set forth in claim 1, wherein said discrete reflector elements are multi-faceted polygons having facets oriented at 90 degrees to each other.

3. A scintillator as set forth in claim 2, wherein said facets are oriented at angles less than 90 degrees to each other.

4. A scintillator as set forth in claim 1, wherein said array of discrete reflector elements covers the entire area of said second surface.

5. A scintillator as set forth in claim 1, wherein said scintillator is a crystal material formed of CsI.

6. A scintillator as set forth in claim 1, wherein said scintillator is a crystal material formed of NaI.

7. A method for increasing spatial resolution of a scintillator which interacts with invisible radiation to produce radiation at visible wavelengths, comprising the steps of:
   providing a scintillator for interaction with invisible radiation; and
   forming an array of discrete reflector elements in a first surface of said scintillator opposite to a second surface which is to be coupled to photodetector means for detecting said visible radiation, for reflecting visible radiation incident thereon back toward said photodetector means;
   wherein said forming step comprises the step of forming in said first surface multi-faceted polygons as said discrete reflector elements, and orienting said facets with respect to each other at angles determined as a function of the energy of radiation intended to interact with said scintillator.

8. A method for increasing spatial resolution of a scintillator which interacts with invisible radiation to produce radiation at visible wavelengths, comprising the steps of:
   providing a scintillator for interaction with invisible radiation; and
   forming an array of discrete reflector elements in a first surface of said scintillator opposite to a second surface which is to be coupled to photodetector means for detecting said visible radiation, for reflecting visible radiation incident thereon back toward said photodetector means, wherein said discrete reflector elements are integrally formed of the same material as said scintillator in the second surface of said scintillator.

9. A method as set forth in claim 8, wherein said discrete reflector elements are multi-faceted polygons having facets oriented at 90 degrees to each other.

10. A method as set forth in claim 9, wherein said facets are oriented at angles less than 90 degrees to each other.

11. A method as set forth in claim 9, wherein said facets are oriented at angles greater than 90 degrees to each other.

12. A method as set forth in claim 8, wherein said array of discrete reflector elements covers the entire area of said second surface.

13. A method as set forth in claim 8, wherein said scintillator is a crystal material formed of CsI.

14. A method as set forth in claim 8, wherein said scintillator is a crystal material formed of NaI.

* * * * *